United States Patent
Boos et al.

(10) Patent No.: US 7,212,843 B2
(45) Date of Patent: May 1, 2007

(54) CURRENT REDUCTION IN A COMMUNICATION DEVICE

(75) Inventors: John P. Boos, Grayslake, IL (US); Steven R. Green, Waterloo (CA)

(73) Assignee: Motorola Inc., Schaumburg, IL (US)

( * ) Notice: Subject to any disclaimer, the term of this patent is extended or adjusted under 35 U.S.C. 154(b) by 385 days.

(21) Appl. No.: 10/438,594

(22) Filed: May 15, 2003

(65) Prior Publication Data

US 2004/0229659 A1 Nov. 18, 2004

(51) Int. Cl.
*H04B 1/38* (2006.01)

(52) U.S. Cl. ............... 455/574; 455/343.2; 455/343.3; 455/343.4; 455/522; 455/67.11; 455/68

(58) Field of Classification Search ............... 455/574, 455/343.2, 343.3, 343.4, 524, 522, 67.11, 455/68
See application file for complete search history.

(56) References Cited

U.S. PATENT DOCUMENTS

| | | | |
|---|---|---|---|
| 5,052,049 A * | 9/1991 | Andros et al. ........... 455/186.1 |
| 5,623,422 A | 4/1997 | Williams |
| 5,953,665 A | 9/1999 | Mattila |
| 6,101,383 A * | 8/2000 | Poon .......................... 455/425 |
| 6,119,002 A | 9/2000 | Alanara |
| 6,128,489 A | 10/2000 | Seazholtz et al. |
| 6,192,244 B1 * | 2/2001 | Abbadessa .................. 455/436 |
| 6,205,334 B1 | 3/2001 | Dent |
| 6,215,982 B1 | 4/2001 | Trompower |
| 6,229,988 B1 * | 5/2001 | Stapefeld et al. .......... 340/7.35 |
| 6,240,288 B1 * | 5/2001 | Wan et al. ................ 455/426.1 |
| 6,252,910 B1 * | 6/2001 | West et al. .................. 375/261 |
| 6,289,227 B1 * | 9/2001 | Shi ............................. 455/574 |
| 2001/0015963 A1 * | 8/2001 | Tuomainen et al. ........ 370/311 |
| 2002/0006805 A1 * | 1/2002 | New et al. .................. 455/525 |
| 2002/0163980 A1 * | 11/2002 | Ruohonen .................... 375/345 |
| 2003/0026242 A1 * | 2/2003 | Jokinen et al. ............. 370/350 |
| 2004/0071119 A1 * | 4/2004 | Ishikawa et al. ............ 370/335 |
| 2004/0185864 A1 * | 9/2004 | Balachandran et al. .. 455/452.2 |
| 2004/0203839 A1 * | 10/2004 | Ostberg et al. ............. 455/455 |
| 2006/0009220 A1 * | 1/2006 | Kiyomoto et al. ....... 455/435.2 |

OTHER PUBLICATIONS

"3GPP Generation Partnership Project; Technical Specification GSM/EDGE Radio Access Network; Radio subsystem link control" (3GPP TS 05.08) vol. 8.15.0, Jul. 2002.

* cited by examiner

*Primary Examiner*—Jean Gelin
*Assistant Examiner*—Huy Phan
(74) *Attorney, Agent, or Firm*—Brian M. Mancini; Matthew C. Loppnow

(57) ABSTRACT

A method for reducing current drain in a communication device includes a first step of developing a history of readings of received signal strengths (RSS) of a neighboring broadcast control channel (BCCH). A next step includes monitoring a RSS of the neighboring channel during a wakeup period. A next step includes determining whether the RSS is substantially stable with respect to the history of readings. A next step includes skipping the monitoring of the RSS for at least one of the subsequent wakeup periods if the RSS is substantially stable with respect to the history of readings.

20 Claims, 2 Drawing Sheets

CURRENT REDUCTION IN A COMMUNICATION DEVICE

FIELD OF THE INVENTION

The present invention generally relates to reducing power consumption, and in particular reducing current drain in a communication device such as a radiotelephone.

BACKGROUND OF THE INVENTION

Many communication devices operate on battery power. The radiotelephones in use today are almost all portable devices utilizing rechargeable batteries that need periodic recharging. The size of the battery and the power efficiency of the communication device determine the amount of talk time available to a user. As a convenience to a user, it has always been desirable to extend the life of the battery to provide longer talk times. However, even with current devices, communications are occasionally interrupted, requiring the recharging of the battery or replacement with a freshly recharged battery. Therefore, it has been desirable to extend the battery life on a communication device.

In most cases, the largest drain on battery power is the transmitter of the communication device, followed by the receiver. The transmitter, or more specifically the power amplifier of the transmitter, in a communication device has typically been configured so that it only draws power when the user wishes to transmit. As the user controls the transmission time, and the level of power transmitted is controlled by standard, the current drain drawn on a battery from the transmitter circuit has already been limited to those times and amounts that are strictly necessary for communication. However, the power used by the receiver is less controlled. For example, the receiver must be ready to receive an incoming call that may occur at any time. For this to happen, the receiver must be on, drawing power, and ready to receive.

Receiver operation is different in different operating systems. For example, the Global System for Mobile (GSM) communication system requires mobile radiotelephones to monitor neighboring cell frequencies for the possibility of reselection in case of dropped service. The intent is that the mobile radiotelephone decodes and synchronizes to neighboring cell carriers, so that the mobile radiotelephone has these carriers from which to choose at the time it determines that a reselection to a different carrier is necessary. The mechanism in the GSM specifications by which the mobile radiotelephone chooses the neighboring cell carriers is the relative signal level (RSS) on the neighboring cell carriers (e.g. broadcast control channels or BCCH). The receiver operates to monitor these channels and keep a list of the strongest available channels. This monitoring is time-gated such that the receiver is powered down (sleeps) during those known times when transmissions cannot be received (i.e. no information is being transmitted). In other words, the receiver only operates at particular time when transmissions can exist to be received. This is referred to as discontinuous reception (DRX) operation. The goal of DRX operation is to reduce the on-time of the radio by powering-off portions of the radio, such as the receiver, during idle (sleep) periods.

In DRX operation, when the radiotelephone is in an idle or sleep mode (i.e., not engaged in a call), the radiotelephone will periodically power its receiver up to monitor any available control channels of neighboring cells and to look for paging activity indicating incoming messages (pages) for the device. In addition, the device monitors the strength of the control channels to determine when a handoff between cells is warranted. In the idle state, the radiotelephone wakes up only during slots preassigned by the radiotelephone system to determine if there are any detectable broadcast control channels (BCCH) and to decode the base station identity code (BSIC) data. The available broadcast control channels to detect are predefined in a BCCH Allocation (BA) list, which is periodically updated, indicating the possible neighboring cells available to the device. However, this periodic type of receiver operation still wastes current since detection is done even when there is no channel signal present or there is no imminent reselection.

The GSM specification 05.08, "Digital Cellular Telecommunications System (Phase 2+); Radio Subsystem Link Control", (European Telecommunications Standards Institute (ETSI), European Standard (Telecommunications Series), version 6.7.2, section 6.6.1, "Monitoring of Received Signal Level and BCCH data", regulates when Receive Signal Strength (RSS) monitoring of neighboring channels must be done. However, this specification does allow the suspension of scanning neighboring cell signal strength depending upon the signal quality of the calling channel. Therefore, one solution to reduce receiver operation and current drain has been to eliminate wakeups and channel signal strength measurements if either the BA list is empty, if an RF signal on any channel of the BA list does not exist, or if an RF signal exists but is of a non-valid communication system signal (i.e. not suitable for reselection). The specification also allows skipping the monitor for channel signal strengths to every other second or fourth defined wakeup period. Therefore, another solution to the problem is to simply provide a fixed reduction percentage of channel signal detections performed. However, in both of these cases the monitoring reduction is driven by an instruction from the network and neither technique takes advantage of the signal quality detection, other than if a signal is present or absent.

Accordingly, there is a need for a method and apparatus for reducing current drain in a communication device using received control channel signal quality information. There is a further need to reduce the current drain by the receiver without the need for network instructions. It would also be of benefit to provide these advantages without additional hardware, which would increase the cost of the communication device.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, and wherein:

DETAILED DESCRIPTION OF A PREFERRED EMBODIMENT

Figure 1:
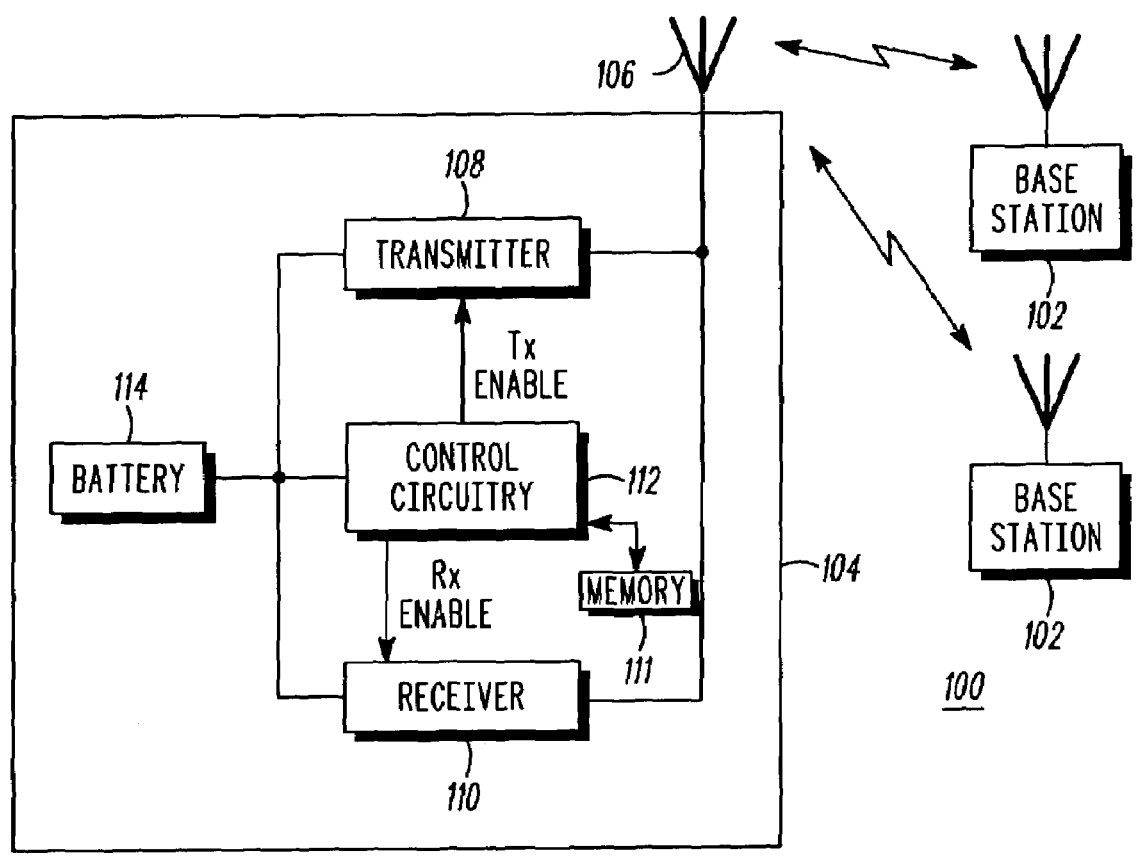
FIG. 1 is a simplified schematic diagram of a communication system, in accordance with the present invention.

The present invention reduces the current drain in the receiver of a communication device by using received control channel signal quality information to control when the receiver is operated. This is accomplished autonomously by the device without the need for network instruction, and provides a further current drain savings over the prior art. This benefit is provided without additional hardware, which would increase the cost of the communication device.

In particular, the present invention uses a history of the received signal strength (RSS) in a Global System for Mobile (GSM) communication system to determine the stability of that reading. For example, if the readings are relatively stable from one wakeup period to the next, then the next reading is omitted. The historical value is used as an approximation, and current is conserved because the communication device is not required to wake up during every wakeup period to take a new RSS reading.

Advantageously, the present invention minimizes the RSS readings when the RSS readings are stable. Dynamically changing the period when the RSS readings are taken optimizes the standby current drain of the communication device. For example, if the communication device is in a relatively stable RSS environment (e.g. walking in an open area, or standing still), the RSS readings will not fluctuate as much as if the communication device is in a higher speed environment (e.g. driving or riding on a train). The present invention allows the communication device to adapt its RSS reading cycle dynamically so as to read the RSS levels frequently when the RSS is changing or absolutely required by the GSM specification or system requirements.

In an existing GSM system, after a mobile radiotelephone is camped within a cell, the radiotelephone is required to search for signals from base stations in neighboring cells, in accordance with the GSM standard. In particular, the radiotelephone receives signal strength measurements of the broadcast control channel (BCCH) carriers in an allocation (BA) list of BCCH frequencies provided by the GSM system in the current (camped) cell. If no list is available, the last received list of the current cell is used, if available. The radiotelephone also reads parameters affecting cell reselection of the surrounding cells from their respective broadcast control channel carriers. Among these parameters is the associated base station identity code (BSIC) and other service information. The mobile regularly updates this information.

The typical prior art communication device reads the received signal strength (RSS) of adjacent cells by turning on the receiver to make at least five RSS readings on each DRX cycle, regardless of the length of the BA list, in accordance with the GSM specification. This activity consumes current because the communication device is taken out of the low current, deep sleep, mode and run in a higher current receive mode on each DRX cycle even if there is a high likelihood of the same reading occurring on a given measurement. The present invention saves current by foregoing RSS readings when the communication device is in a stable RSS environment, as allowed by the GSM specification.

Referring now to FIG. 1, a radiotelephone system 100 includes a plurality of base stations such as base stations 102 configured for radio communication with one or more communication devices including a Global System for Mobile (GSM) communication system radiotelephone such as radiotelephone 104. The radiotelephone 104 is configured to receive and transmit GSM signals to communicate with the plurality of base stations, including base stations 102. In the illustrated embodiment, the radiotelephone system 100 is operable on a local cell of the communication system with neighboring cells hosted by base stations 102.

The radiotelephone 104 includes an antenna 106 coupled to a transmitter 108 and receiver 110. It should be recognized that there are many other known devices necessary in the operation of the radiotelephone that are not shown, to avoid confusion. The transmitter 108 and receiver 110 are coupled to, and controlled by, control circuitry 112, such as a microprocessor, microcontroller, DSP, or other similar control device. A battery 114 provides operating power to the other components of the radiotelephone 104. Preferably, the battery is rechargeable.

The antenna 106 receives RF signals from base stations 102 in the vicinity. Received RF signals are converted to electrical signals by the antenna 106 and provided to the receiver 110 to provide conversion to baseband signals. The receiver 10 includes an amplifier and other circuitry, such as RF circuits and demodulation circuitry, as is known in the art. The baseband signals are provided to the other circuits (not shown) in the radiotelephone 104, which converts them to streams of digital data for further processing. Similarly, the radiotelephone 104 provides baseband signals through modulation circuitry (not shown) to the transmitter 108, which sends electrical RF signals to the antenna 106 for transmission to the base stations 102 in the vicinity. Typically, amplifiers consume the most power in the circuits of the radiotelephone 104.

The control circuitry 112 controls the functions of the radiotelephone 104. The control circuitry 112 operates in response to stored programs of instructions and includes a memory 111 for storing these instructions, the BA list, RSS data, and other data. The control circuitry 112 is also coupled to other elements of the radiotelephone 104, which are not shown in FIG. 1, so as to not unduly complicate the drawing. For example, the radiotelephone will typically include a user interface to permit user control of the operation of the radiotelephone 104. The user interface typically includes a display, a keypad, a microphone and an earpiece. The user interface is coupled to the control circuitry 112.

In the GSM system, the communication device 104 is directed to periodically search for neighboring cells, and their associated base stations 102. If a neighboring base station has a broadcast control channel (BCCH) signal strength, measured as a received signal strength (RSS), that is greater than in the existing cell, then reselection to the neighboring cell can be initiated. The measurement of RSS of neighboring cell broadcast control channels requires that the receiver be turned on periodically to perform this signal strength measurement. Further, the GSM system is a time-gated communication system, wherein the transmitter 108 and receiver 110 are enabled at only certain time slots dictated by the GSM system when information may be present to be transmitted or received. During these time slots, the transmitter or receiver is woken up for a certain period (wake-up period) to perform these operations. The drain on the battery is greatest when the transmitter is enabled, followed by when the receiver is enabled. Of course, the device knows if it will be transmitting and enables the transmitter accordingly. However, the device does not know if there is a communication available to be received, so the device is normally gated on during the receiver time slots, to perform the RSS measurement as well as the detection of messages (pages) available to the device. This receiver on-time needlessly shortens the life of the charge in the battery when there is no information to be transceived or if reselection is not a possibility.

The present invention defines a method and apparatus to reduce the receiver on-time, and subsequent extraneous current drain, thus reducing the overall current consumption for a communication device. Specifically, the present invention provides a communication device 104 with at least a receiver 110, a memory 111, and a control circuit 112 coupled to both the memory and receiver. The receiver 110 is operable to monitor received signal strengths (RSS) of broadcast control channels (BCCH) of base stations 102 of at least one neighboring channel. The device stores a list of available neighboring channels to measure in a BCCH allocation (BA) list, which is generated as is known in the art. The memory 111 serves to store the monitored received signal strengths (RSS) of the broadcast control channels (BCCH) of base stations 102 of neighboring channels. The control circuit 112 is operable to enable the receiver 110 and to store in the memory 111 the RSS measurements for each BCCH from the receiver 110. In particular, the control circuit stores a history of RSS readings of the at least one neighboring channel by the receiver. More particularly, the memory stores a separate history of readings for each neighboring cell control channel.

A novel aspect of the present invention is that the control circuit can determine if a received signal strength is substantially stable with respect to the history of readings in the memory. The GSM standard allows the skipping of wake-up periods depending on the quality of the RSS signal (discontinuous reception mode or DRX). Therefore, the present invention provides that if the quality of the received signal is stable the control circuit directs (does not enable) the receiver in order to skip the monitoring of the received signal strength of the at least one neighboring channel for at least one subsequent wakeup period. The GSM standard permits the skipping of every other receiver wake-up period, or even skipping three out of four wake-up periods for very stable received signals, as long as there are five past RSS readings available for any particular BCCH. Along these lines, the control circuit is operable to determine whether the skipping of monitoring for a subsequent wakeup period would exceed the wakeup period interval required to retain at least five signal strength measurements in memory. In this case, the control circuit would not direct the receiver to skip (Rx enabled) the monitoring of the received signal strength of the at least one neighboring channel for at least one subsequent wakeup period. The present invention uses these past RSS readings to advantage by storing a running average of previously received signal strengths in the memory for use in determining stability, as will be explained below.

Stability is defined as a received signal strength for any particular broadcast control channel staying within a predetermined range levels. In particular, the present invention uses a window of +/−3 db to define a stable RSS. Of course, range limits other than 3 dB can be used, and may be dynamically applied depending on the communication environment. If the control circuit detects that a received signal strength is within the predetermined range level of the running average of the history of RSS readings, then stability is indicated and the control circuit is operable to direct the receiver to skip monitoring to every other wakeup period. Further, if continued stability is indicated, the control circuit is operable to direct the receiver to skip monitoring to every fourth wakeup period. Then if stability deteriorates, the control circuit can direct the receiver to operate at every other wake-up period, or even every wake-up period, as necessary.

Figure 2:
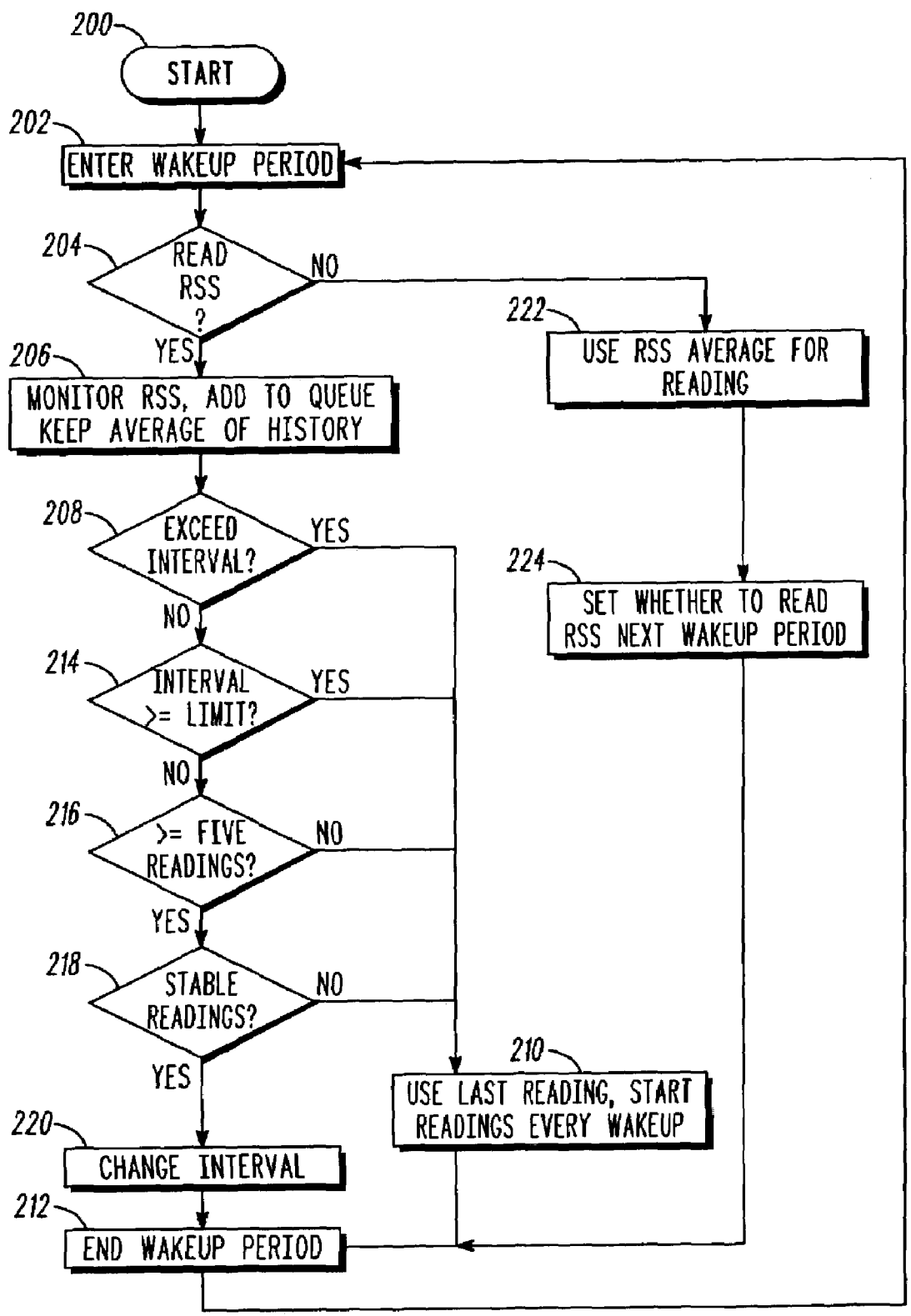
FIG. 2 is a flow chart for a method of reducing current drain in a receiver, in accordance with the present invention.

FIG. 2 shows a method for reducing current drain in a communication device, in accordance with the present invention. At the initial start conditions 200, a queue of RSS readings for at least one neighboring broadcast control channel (BCCH) in the BA list in the memory is empty, the receiver is in sleep mode, and the receiver is required to take RSS readings during each wakeup period. At a first step 202, the device enters a time slot for monitoring neighboring channels. If the receiver is to take an RSS measurement 204, as is the case upon initialization, the receiver is then enabled by the control circuit to wakeup to monitor a received signal strength (RSS) 206 of at least one of the neighboring broadcast control channels during the wakeup period. The receiver then takes an RSS reading, and adds the RSS reading to the queue of the last five RSS readings (if any), discarding the oldest reading and calculate a running average reading for the queue. This develops a history of readings of received signal strengths of the neighboring channels. A separate history of readings is kept for each neighboring channel in the BA list.

In a next step 208, the device determines whether skipping the next wakeup period would result in exceeding the interval required to keep at least five received RSS measurement samples within the GSM specification interval. If the interval would be exceeded, then the control circuit sets itself to enable the receiver for every wakeup period to take RSS readings 210, and the wakeup period ends 212 with the receiver entering sleep mode again to wait for the next wakeup period 202. However, if the interval is not exceeded, then the control circuit proceeds with several more tests, as follows.

In a next step 214, the device determines if the DRX interval is greater than or equal to a predefined limit. Such limit is defined and set for the system, and is an absolute limit wherein a DRX reading must be taken. In other words, the predefined limit is used to set the maximum allowable DRX interval for using averaged RSS readings. If the DRX interval is greater than or equal to the limit, then the control circuit sets itself to enable the receiver for every wakeup period to take RSS readings 210, and the wakeup period ends 212 with the receiver entering sleep mode again to wait for the next wakeup period 202. However, if the DRX interval is less than the limit, then the control circuit proceeds with more tests, as follows.

In a next step 216, the device determines if there are at least five readings in the RSS queue for the BCCH of interest. In other words, a check is made for a sufficient history in the queue to provide a running average for determining the stability of the RSS measurements for the BA list. If there are not at least five RSS readings in the queue, then the control circuit sets itself to enable the receiver for every wakeup period to take RSS readings 210, and the wakeup period ends 212 with the receiver entering sleep mode again to wait for the next wakeup period 202. However, if there are at least five readings, then the control circuit proceeds with another test, as follows.

In a next step 218, the device determines whether the received signal strength indicator is substantially stable with respect to the history of readings. In particular, substantial stability is indication if the received signal strength is within a predetermined range (e.g. 3 db) of the history of readings. If stability is not indicated, then the control circuit sets itself to enable the receiver for every wakeup period to take RSS readings 210, and the wakeup period ends 212 with the receiver entering sleep mode again to wait for the next wakeup period 202. However, if stability is indicated, then the control circuit proceeds change the DRX interval.

Specifically, the device skips the monitoring of the received signal strength of the at least one neighboring channel for at least one subsequent wakeup period if the received signal strength is substantially stable with respect to the history of readings. More specifically, the queue average for the RSS reading for this DRX wakeup cycle is used, and the control circuit is set to skip the enabling of the receiver for the next DRX wakeup cycle. If the control circuit is already set to skip the enabling of the receiver for the next DRX wakeup cycle, then the control circuit is set to skip the enabling of the receiver to every fourth DRX wakeup cycle. This changes the interval on which RSS readings are taken 220. Therefore, if there is sufficient RSS history, and the RSS readings are sufficiently stable, then the phone will first start reading at every other DRX wakeup. If the readings continue to be stable, then the phone can increase the interval to every fourth DRX wakeup.

Thereafter, the receiver enters sleep mode again to wait for the next indicated wakeup period 202. The above steps are then repeated, starting from step 202, wherein the device enters a time slot for monitoring neighboring channels. If the receiver is to take an RSS measurement 204, the flow continues as before. However, if the receiver is to skip one or more RSS measurements, then the receiver is not enabled by the control circuit to wakeup, and the average of the queue of RSS readings is used 222 as the RSS reading for this DRX wakeup period. Afterwards, the RSS reading interval (each, second or fourth interval) is noted 224 to decide whether the control circuit should set the enablement of the receiver for the next wakeup time slot, and the wakeup period ends 212 with the receiver entering sleep mode again to wait for the next wakeup period 202.

As can be seen from the foregoing, the present invention provides a method and apparatus for reducing the current drain in a communication device by determining when RSS levels are stable enough to permit a receiver to reduce the number of wake-up periods to monitor RSS of neighboring cells. While a particular embodiment of the present invention has been shown and described, modifications may be made. It is therefore intended in the appended claims to cover all such changes and modifications which fall within the broad scope of the invention.

What is claimed is:

1. A method for reducing current drain in a communication device, the method comprising the steps of:
    developing a history of readings of received signal strengths of at least one neighboring channel;
    monitoring a received signal strength of the at least one neighboring channel during a wakeup period;
    determining whether the received signal strength is substantially stable with respect to the history of readings; and
    skipping the monitoring of the received signal strength of the at least one neighboring channel for at least one subsequent wakeup period if the received signal strength is substantially stable with respect to the history of readings.

2. A method as recited in claim 1, further comprising the step of operating the communication device in a Global System for Mobile (GSM) communication system.

3. A method as recited in claim 1, wherein the history of the developing step includes a running average of previously received signal strengths.

4. A method as recited in claim 1, wherein the channel monitored is a broadcast control channel (BCCH) and further comprising the step of repeating the above steps for each neighboring broadcast control channel in a BCCH Allocation (BA) list.

5. A method as recited in claim 1, wherein the skipping step includes determining whether the skipping of monitoring for a subsequent wakeup period would exceed the wakeup period interval required to retain at least five signal strength measurements, whereupon skipping is not allowed.

6. A method as recited in claim 1, wherein the determining step includes an indication of substantial stability if the received signal strength from the monitoring step is within a predetermined range of the history of readings.

7. A method as recited in claim 1, further comprising the step of repeating the above steps and skipping to monitoring every fourth wakeup period if continued stability is indicated in the determining step.

8. A method as recited in claim 1, wherein the developing step includes keeping a separate history of readings for each neighboring channel.

9. A method for reducing receiver current drain in a GSM communication device, the method comprising the steps of:
    developing a running average of a history of readings of received signal strengths (RSSs) for each of at least one neighboring broadcast control channel (BCCH);
    monitoring a RSS of the at least one neighboring BCCH during a wakeup period;
    determining whether the RSS is substantially stable with respect to the history of readings; and
    skipping the monitoring of the RSS of the at least one BCCH for at least one of the subsequent wakeup periods if the RSS is substantially stable with respect to the history of readings.

10. A method as recited in claim 9, further comprising the step of repeating the above steps for each neighboring BCCH in a BCCH Allocation (BA) list.

11. A method as recited in claim 9, wherein the skipping step includes determining whether the skipping of monitoring for a subsequent wakeup period would exceed the wakeup period interval required to retain at least five RSS measurements, whereupon skipping is not allowed.

12. A method as recited in claim 9, wherein the determining step includes an indication of substantial stability if the RSS from the monitoring step is within a predetermined range of the history of readings.

13. A method as recited in claim 9, further comprising the step of repeating the above steps and skipping to monitoring every fourth wakeup period if continued stability is indicated in the determining step.

14. A communication device with reduced current drain, the communication device comprising:
    a receiver operable to monitor received signal strengths of neighboring channels;
    a memory to store monitored received signal strengths; and
    a control circuit coupled to the receiver and the memory, the control circuit operable to store in the memory a history of readings of received signal strengths of at least one neighboring channel by the receiver and determine if a received signal strength is substantially stable with respect to the history of readings, whereupon the control circuit directs the receiver to skip the monitoring of the received signal strength of the at least one neighboring channel for at least one subsequent wakeup period.

15. A device as recited in claim 14, wherein the control circuit is operable to store a running average of previously received signal strengths in the memory.

16. A device as recited in claim 14, wherein the receiver is operable to monitor a received signal strength (RSS) for each neighboring broadcast control channel (BCCH) in a BCCH Allocation (BA) list.

17. A device as recited in claim 14, wherein the control circuit is operable to determine whether the skipping of monitoring for a subsequent wakeup period would exceed the wakeup period interval required to retain at least five signal strength measurements in memory, wherein the control circuit would not direct the receiver to skip the monitoring of the received signal strength of the at least one neighboring channel for at least one subsequent wakeup period.

18. A device as recited in claim 14, wherein the control circuit is operable to determine whether a received signal strength is substantial stable by confirming that the received signal strength is within a predetermined range of the history of readings.

19. A device as recited in claim 14, wherein the control circuit is operable to direct the receiver to skip monitoring to every fourth wakeup period if continued stability is indicated.

20. A device as recited in claim 14, wherein the memory stores a separate history of readings for each neighboring channel.

\* \* \* \* \*